US008793969B2

(12) United States Patent  
Scherf

(10) Patent No.: US 8,793,969 B2  
(45) Date of Patent: Aug. 5, 2014

(54) ROUND STEEL CHAIN

(75) Inventor: Burkhard Hermann Scherf, Bergkamen (DE)

(73) Assignee: Thiele GmbH & Co. KG, Iserlohn (DE)

( * ) Notice: Subject to any disclaimer, the term of this patent is extended or adjusted under 35 U.S.C. 154(b) by 0 days.

(21) Appl. No.: 14/118,151

(22) PCT Filed: May 16, 2012

(86) PCT No.: PCT/DE2012/100141  
§ 371 (c)(1),  
(2), (4) Date: Nov. 15, 2013

(87) PCT Pub. No.: WO2012/155899  
PCT Pub. Date: Nov. 22, 2012

(65) Prior Publication Data  
US 2014/0090351 A1      Apr. 3, 2014

(30) Foreign Application Priority Data  
May 17, 2011    (DE) .......................... 10 2011 050 425

(51) Int. Cl.  
*F16G 15/12*        (2006.01)
(52) U.S. Cl.  
USPC ........................................ 59/84; 59/78; 59/90
(58) Field of Classification Search  
USPC ............................................ 59/78, 84, 90, 93  
See application file for complete search history.

(56) References Cited

U.S. PATENT DOCUMENTS

| 3,453,823 | A | * | 7/1969 | Mundt | 59/90 |
| 3,744,239 | A |   | 7/1973 | L'Anson | |
| 4,627,232 | A | * | 12/1986 | Bruce | 59/84 |
| 7,107,754 | B2 | * | 9/2006 | Sinz et al. | 59/78 |
| 2003/0131580 | A1 | | 7/2003 | Dalferth et al. | |
| 2005/0113198 | A1 | | 5/2005 | Benecke | |

FOREIGN PATENT DOCUMENTS

| DE | 39 29 148 | 1/1991 |
| DE | 198 06 719 | 10/1998 |
| DE | 203 16 017 | 2/2004 |
| DE | 103 48 491 | 7/2005 |
| DE | 202011003248 | 6/2011 |
| WO | WO 02/12753 | 2/2002 |

* cited by examiner

*Primary Examiner* — David B Jones  
(74) *Attorney, Agent, or Firm* — Henry M. Feiereisen LLC

(57) ABSTRACT

A round steel chain has chain links articulated to one another, wherein the individual chain links each have opposite chain bends, which are connected to one another by chain legs. At least every second chain link is designed as a flat link, wherein the chain legs of the flat link are flattened at the edges in the cross-section of the chain legs and have a leg width greater than the diameter of the chain bends, such that the areas of the chain legs extending beyond the diameter to the leg width form lateral bulges, which extend up to the chain bends or into the chain bends, and chain bends have thickened sections arranged on the longitudinal outer surfaces of the chain bends.

11 Claims, 2 Drawing Sheets

ROUND STEEL CHAIN

CROSS-REFERENCES TO RELATED APPLICATIONS

This application is the U.S. National Stage of International Application No. PCT/DE2012/100141, filed May 16, 2012, which designated the United States and has been published as International Publication No. WO 2012/155899 and which claims the priority of German Patent Application, Serial No. 10 2011 050 425.7, filed May 17, 2011, pursuant to 35 U.S.C. 119(a)-(d).

BACKGROUND OF THE INVENTION

The invention relates to a round steel chain of hingedly interconnected chain links.

Chains are formed from a plurality of chain links arranged successively to form an open or a closed chain strand. The individual chain links can be interconnected for example by releasable hinges or directly hingedly joined with one another. Chains serve predominantly as heavy-duty traction means having a force direction which due to the hinged configuration is also deflectable.

Round steel chains are formed from directly interengaged chain links, which at least in some sections have a rounded cross section. Such a chain link of steel is formed, for example, from a round rod of corresponding length, which is first correspondingly shaped, whereupon its free ends are joined together.

In underground coal mining, round steel chains are used for example for operation of coal planes or for continuous transport of recovered excavations. In particular during transport, they are pulled as circulating conveyor chains over a conveyor trough and deflected at the end. Since in the chain strand the chain links engaging one another with their bends are already structurally arranged rotatably relative to one another, they are differentiated as alternating horizontal and vertical links.

To increase the transport quantities of such facilities, the performance has to be increased. As a result, the forces to be transmitted are increased, so that the individual chain links must be sized larger. While the horizontal links due to their parallel orientation to the trough have enough space available, the corresponding upright vertical links are contrary to the desire for a lowest possible height. Therefore, in particular the vertical links are formed in the art as flat links, and their height can be reduced by border-side flattening of the chain legs.

DE 103 48 491 B3 discloses a round steel chain link with hingedly interconnected chain links, with the chain legs of at least every second chain link being flattened in cross section at the margin to form a flat link. The chain legs of the flat links have a greater leg width in relation to the diameter of the chain bends. As a result, the regions of the chain legs extending beyond the diameter to the leg width form lateral bulges which extend to the chain bends or into the chain bends.

The bulges allow a further reduction of the height of the flat links, since the lacking material volume due to the flattenings are displaced into the cross section of the bulges. As a result, the required cross sectional area is maintained despite smaller height dimensions.

In particular the contact surfaces located between the interengaging chain bends of the individual chain links are subject to increased wear both with respect to the normal chain links and also with respect to the flat links. In addition to the applied tensile force which must be transmitted via these contact surfaces, the required mobility between the chain links leads to high friction which causes correspondingly high wear.

Against this background, there is generally still room for improvements when designing round steel chains in particular in the region of the interengaging chain links.

SUMMARY OF THE INVENTION

The present invention is based on the object improve a round steel chain from hingedly interconnected chain links such as to substantially reduce wear occurring between the chain links.

This object is achieved in accordance with the invention by a round steel chain of hingedly interconnected chain links, with the individual chain links having opposing chain bends which are connected with one another via chain legs, wherein the chain bends have thickenings on the their longitudinal outer surfaces and have in their corresponding cross section an outer radius and a greater inner radius), with the envelope circle defined by the inner radius touching the envelope circle defined by the outer radius in an apex point located on the inner side of the chain bends.

The round steel chain shown hereinafter is formed in a known manner from hingedly interconnected chain links. The individual chain links have each hereby two oppositely located chain bends, which are connected with each other by two chain legs. The chain bends have hereby thickenings on their longitudinal outer surfaces.

According to the invention, the chain bends in their cross section have an outer radius and a greater inner radius, with the envelope circle defined by the inner radius touches the envelope circle defined by the outer radius in an apex point located on the inner side of the chain bends. As a result of the greater inner radius compared to the outer radius, the contact surface between the interengaging chain bends is increased so that their wear is reduced. Since the corresponding envelope circles are in contact in the apex point located on the inner side of the chain bends, the diameter of the chain bends as measured in transverse direction and in longitudinal direction remains the same. In this manner, the length of the chain link extending in the longitudinal direction can be maintained. In addition to the thus-saved material, sufficient space remains for the immediately adjacent chain links to embrace the respective chain bend.

The particular advantage of the thickenings that extend beyond the cross section of the chain bends resides, in addition to the cross sectional thickening, in particular in the increased contact surface between the embracing chain links. Thus, the tensile force to be absorbed by the chain strand is transmitted across a greater contact surface so that stress (tensile force per contact surface) is less. As a result, wear between the chain bends of the chain links is reduced so that the service life of the round steel chain increases.

Advantageous embodiments of the basic concept of the invention are the subject matter of the dependent patent claims.

Preferably, at least every second chain link of the round steel chain is formed as a flat link. This in particular when used as a conveyor chain. For this purpose, the chain legs of the flat link are flattened in cross section at the border. Furthermore, the chain legs have a greater leg width relative to the diameter of the chain bends of the flat link. As a result, the regions of the chain legs extending beyond the diameter to the leg width form lateral bulges. These bulges extend either to the chain bends or into the chain bends.

Since the cross sectional area of the chain legs is shifted into the bulges, the flat link overall can obtain a lower height by flattening the chain legs in relation to normal flat links more at the border side. To increase the load-bearing capacity of the chain strand as a whole, the bulges and the thickenings can be enlarged so that the service life can be additionally improved despite increased requirements.

It is provided to arrange each of the thickenings within the envelope circle defined by the inner radius. Basically, the contour of the thickenings can at least in some areas touch the thus-defined envelope circle or lie on it.

To obtain a possible uniformly formed and largest possible contact surface between the encompassing chain bends, the inner radius can transition into the respective thickenings. As a result, a continuous identically curved contact surface is provided between the chain links and able to effect in the ideal case a full surface contact in the contacting regions.

The thickenings of the chain bends can, for example, transition into the bulges of the chain legs. Preferably, the thickenings can be spaced-apart from the bulges of the flat link. In this way, a cross sectional thickening of the chain links is provided only at the locations which require this.

When the bulges and the thickenings are spaced from one another, they form a transition region between them. In an advantageous manner, the transition zone between the thickenings and the bulges of the flat link can correspond in its cross sectional width measured in direction of its leg width to the diameter of the chain bends. In addition to the material saving by the spacing, also the weight of the chain links is not unnecessarily increased, which overall has an impact both ecologically and economically.

The thickenings can be formed, for example, strand-like or wave-like. Furthermore, point thickenings spaced from one another are conceivable. Preferably, the thickenings are suited in their shape to the course of chain bends. For this purpose, at least one of the thickenings can be formed sickle-shaped.

The chain bends have in the region of the thickenings a width which is measured in direction of the leg width of the chain leg and which is greater as a result of the thickenings than the diameter of the chain bends. This width and the leg width are each suited to the individual requirements in terms of traction force and wear reduction. The width can be greater or smaller than the leg width. In an alternative embodiment, the width of the chain bends as determined by the thickenings corresponds to the leg width of the chain legs. Thus, the maximum chain link width in the region of the thickenings and the bulges is identical, thereby promoting an economical production of the chain links.

Basically, the length of the flattened regions of the chain legs extending at the border side is dependent on the actual basic form of the chain link. Thus, the length of the flattened region of a chain link with an oval basic form is smaller in relation to a substantially straight course of the chain leg. Furthermore, the length of the flattened regions can be adapted and in particular extended, when cross sectional area is shifted as much as possible into the bulges of the chain leg. The thus inevitably reducing height of the flat link causes the flattened regions to extend further in the outer rounding of the chain bends. In order to realize an economical ratio between these embodiments, the length of the flattened regions can be preferably greater than or equal to the pitch of the flat link, The pitch is defined hereby by the clearance between the inner sides of the chain links, particularly between the chain bends.

Depending on the requirements and tensile forces to be transmitted, the invention provides that at least each second of the chain links, in particular the flat link, has a central web connecting the chain legs with one another. The central web overall increases the stability of the chain links. In particular, the opposing chain legs are held by the central web at a same distance to each other.

The present invention shows the novel configuration for the chain links of a round steel chain, with which known wear between the embracing chain bends is significantly reduced overall. As a result, the elongation of the chain strand inevitably produced during wear is slowed down and its service life is overall increased. The periods of stoppage caused by an exchange of such round steel chains are thus reduced, since the chain must not be exchanged as often.

In combination with the bulges and the thickenings the thereby determined cross section ratio to one another is available, which is ideally adaptable to the individual requirements of use. It is conceivable that also the cross section of the chain bends can be reduced, since a part of the cross section area is displaced into the thickenings. Thereby the required material quantity of the chain link remains the same, with simultaneous reduction of the usual wear.

BRIEF DESCRIPTION OF THE DRAWINGS

The invention is subsequently described with reference to some embodiments which are schematically shown in the drawings. It is shown in.

DESCRIPTION OF THE PREFERRED EMBODIMENTS

Figure 1:
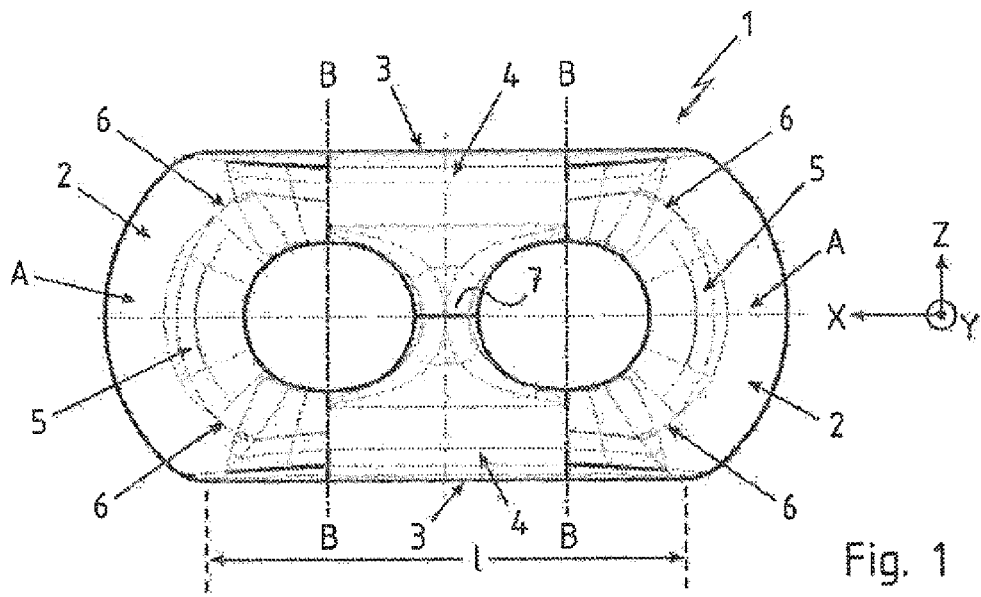
FIG. 1 a side view of a chain link of the round steel chain according to the invention.

FIG. 1 shows a single link of a not shown round steel chain. In the present case the chain link is formed as a flat link 1. The flat link 1 has the typical structure of chain links with chain bends 2 and chain legs 3. The two oppositely located chain bends 2 are connected with one another via the two chain legs 3, wherein the chain legs 3 extend in a longitudinal direction X of the chain link.

In the present embodiment as the flat link 1 the chain leg 3 of the shown chain link is correspondingly flattened in its cross section at border side. The flattened region of the chain leg 3 is arranged in relation to its cross section so that the height in the vertical direction Z of the chain link is overall reduced.

The flattened chain leg 3 has a greater leg width e than the diameter d of the chain bends 2. The leg width e and the diameter d are measured in each case in transverse direction Y of the flat link 1 and compared with one another. The regions of the chain leg 3 extending beyond the diameter d to the leg width e form in this way lateral bulges 4. The bulges 4 extend therefore in the longitudinal direction X of the flat link 1 laterally of the chain leg 3. The bulges 4 extend hereby towards the chain legs 3. Depending on the definition of the position of the end of the chain leg 3 and the beginning of the chain bend 2, the bulges 4 can extend also into the chain bends 2. Here the boundary B between the chain bends 2 and the chain legs 3 as shown in FIG. 1 is defined so that the bulges 4 extend into the chain bends 2.

Figure 2:
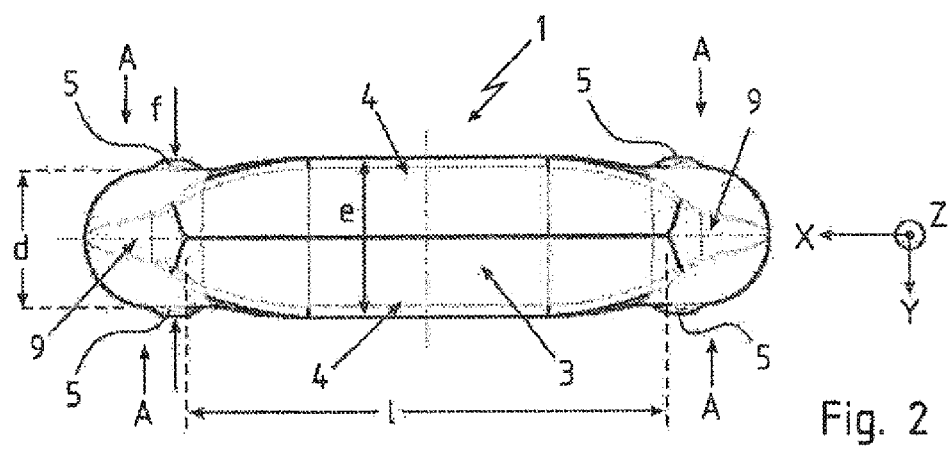
FIG. 2 a top view of the chain link of FIG. 1 in its position rotated by 90° about its longitudinal direction FIG. 3 a section of the chain link of FIG. 2 through the top view thereof.

FIG. 2 shows the flat link 1 of FIG. 1 as rotated by 90° about the longitudinal direction X of the chain link. In this view, its configuration in transverse direction Y of the chain link is clear. While the chain bends 2 extend in a plane defined by the longitudinal direction X and the vertical direction Z of the chain link (see FIG. 1), the chain bends 2 have thickenings 5 on their longitudinal outer surfaces A.

The thickenings 5 extend beyond the diameter d of the chain bends 2. As a result, the width f of the chain bends 2 measured in direction of the leg width e in the region of the thickenings 5 exceeds its diameter d. In the present embodiment of the flat link 1, the thus-measured width f of the chain bends 2 in the region of the thickenings 5 corresponds to the leg width e.

Looking back to FIG. 1, the course of the thickenings 5 can be seen on the outer surfaces A of the chain bends 2. The thickenings 5 are suited to the curved course of the chain bends 2. The thickenings 5 are formed sickle-shaped, wherein the opposing thickenings 5 are open to one another on the plane of the flat link 1 as defined by the transverse direction Y and the vertical direction Z. In their form the thickenings 5 transition toward their inner sides into the chain bends 2, with the thickenings 5 being spaced from the bulges 4 of the flat link 1.

Figure 3:
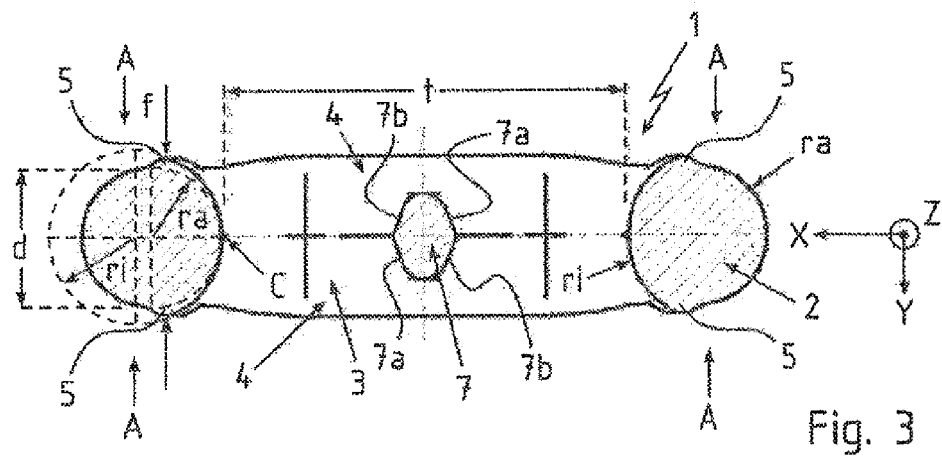

FIG. 3 shows the flat link 1 in a same representation as in FIG. 2, but in a sectional plane, with the plane being defined by the longitudinal direction X and the transverse direction Y of the flat link 1. In the sectional view, it can be seen that the chain bends 2 in their corresponding cross section have different radii ri, ra on their inner sides and outer sides. More particularly, the chain bends 2 have in cross section an outer radius ra and an inner radius ri, with the inner radius ri being greater than the outer radius ra.

Both the outer radius ra and also the inner radius ri correspondingly define an envelope circle. Looking at the illustration in FIG. 3, it becomes clear that the corresponding centers of both envelope circles do not meet in a point, but are spaced from one another. In particular the center of the envelope circle defined by the inner radius ri is offset relative to the envelope circle of the outer radius ra to the outer side of the chain bends 2 in longitudinal direction X of the flat link 1. The envelope circle defined by the inner radius ri touches hereby the envelope circle defined by the outer radius ra in an apex point C located on the inner side of the chain bends 2. The apex point C forms hereby the apex of the curvature profile formed by the inner radius ri on their respective inner sides.

The sectional illustration of FIG. 3 clearly shows that the thickenings 5 are each located inside the envelope circle defined by the inner radius ri. It is to be understood hereby that the course of the chain bends 2 on their inner sides overlaps with the envelope circle defined by the inner radius ri, in particular that they are located at least in some section on top of one another. Furthermore, the chain bends 2 are formed on their inner sides such that their inner radius ri seamlessly transitions into the corresponding thickenings 5. As a result, the regions of the thickenings 5 located towards the inner side of the chain bends 2 are located inside the envelope circle defined by the inner radius ri or located with their contour at least in some areas on its course.

The clearance of the chain link between the inner sides of the chain bends 2 forms its pitch t. With reference to the illustrations of FIGS. 1 and 2, the flattened region of the chain leg 3 has a length l extending in longitudinal direction X. A comparison between FIGS. 1 to 3 clearly shows that the border-side length l of the flattened regions of the chain legs 3 is greater that the pitch t of the chain link, in particular of the flat link 1. Depending on requirements, an alternative embodiment can include that the length l of the flattened regions and the pitch t are of same size.

As already shown in FIG. 1 and illustrated in FIG. 3 in cross section, especially the chain link 1 further has a central web 7 which connects the chain legs 3 with one another. The central web 7 in sectional plane of FIG. 3 has a rhomboid cross section with side surfaces 7a and 7b extending parallel to each other. The side surfaces 7a,7b extending in transverse direction Y in non-parallel relation to one another meet in their extensions at an acute angle, which is evenly flattened in the structural design of the central web 7.

Figure 4:
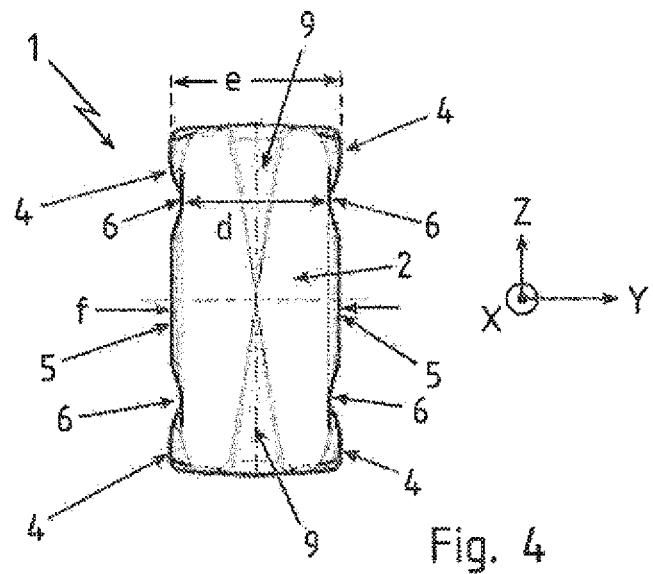
FIG. 4 an end view of the chain link of FIGS. 1 to 3.

FIG. 4 shows an end view of the flat link 1 of FIGS. 1 to 3 looking in its longitudinal direction X. This view clearly shows that the thickenings 5 of the chain bends 2 and the bulges 4 of the chain legs 3 form a transitional zone 6 there between. The transitional zone 6 between the thickenings 5 and the bulges 4 of the flat link 1 corresponds in its cross sectional width as measured in direction of the leg width e to the diameter d of the chain bends 2.

In an alternative embodiment, the cross sectional width can, of course, be greater than the diameter d of the chain bends 2. Optionally, a further alternative can dispense with the transitional zone 6 so that the bulges 4 of the chain legs seamlessly transition into the thickenings 5 of the chain bends 2.

Figure 5:
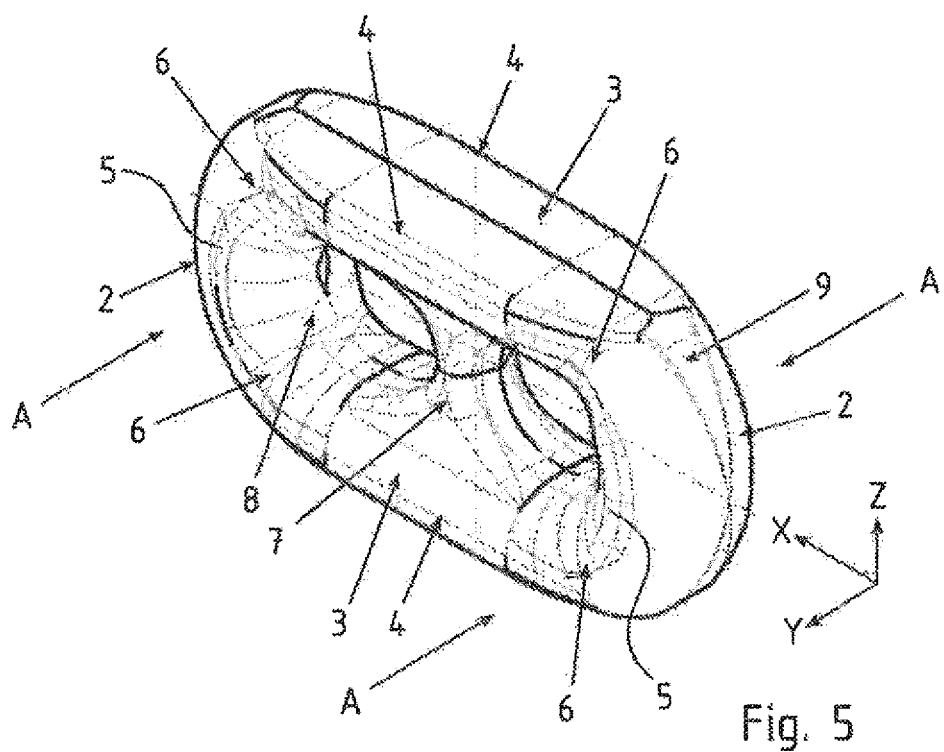
FIG. 5 a perspective illustration of the chain link of FIGS. 1 to 4.

FIG. 5 illustrates again the shape of the flat link 1 by way of a perspective view. A contact surface 8 can be clearly seen which expands extensively through the thickenings 5 on the inner sides of the chain bends 2.

With reference to FIGS. 1 to 5, the flat link 1 can be formed such that the flattened chain leg 3 transitions into triangular surfaces 9 formed on the chain bends 2. Basically, the chain bends 2 can also have the outer radius ra in these regions so that no triangular surfaces 9 are formed. In the event, the triangular surfaces 9 are formed, the triangular surfaces 9 formed correspondingly each on one of the chain bends 1 can taper towards one another to meet at an end face of the chain bends 2. As an alternative, the converging triangular surfaces may also transition into one another at the end face of the chain bends 2, with the chain bends 2 being flattened at the end face.

The invention claimed is:

1. A round steel chain, comprising a plurality of hingedly interconnected chain links having each opposing chain bends which are connected with one another via chain legs and have a thickening at longitudinal outer surfaces of the chain bends, said thickening providing an enlarged contact surface between embracing ones of the chain links, said chain bends having in a cross section an outer radius which defines an envelope circle and an inner radius which is greater than the outer radius and defines an envelope circle which touches the envelope circle defined by the outer radius in an apex point on an inner side of the chain bends.

2. The round steel chain of claim 1, wherein at least every second one of the chain links is formed as a flat link, with the chain legs of the flat link being flattened in their cross section at their border and having a leg width which is greater than a diameter of the chain bends so that a region of the chain legs extending beyond the diameter to the leg width forms a lateral bulge which extends to the chain bends or into the chain bends.

3. The round steel chain of claim 1, wherein the thickening is each located inside the envelope circle defined by the inner radius.

4. The round steel chain of claim 1, wherein the inner radius transitions into the thickening.

5. The round steel chain of claim 2, wherein the thickening is spaced from the bulge of the flat link.

6. The round steel chain of claim 2, further comprising a transition zone between the thickening and the bulge of the flat link, said transition zone having a cross sectional width which is measured in a direction of the leg width and corresponds to the diameter of the chain bends.

7. The round steel chain of claim 1, wherein the thickening is formed sickle-shaped.

8. The round steel chain of claim 2, wherein the chain bends have a width which is measured in a direction of the leg width and correspond in a region of the thickening to the leg width.

9. The round steel chain of claim 2, wherein the chain legs have a border-side flattened region defined by a length which is sized greater than or equal to a pitch of the flat link.

10. The round steel chain of claim 1, wherein at least every second one of the chain link has a central web connecting the chain legs with each other.

11. The round steel chain of claim 2, wherein the flat link has a central web connecting the chain legs with each other.

* * * * *